US012724296B2

(12) United States Patent
Lu et al.

(10) Patent No.: US 12,724,296 B2
(45) Date of Patent: Sep. 1, 2026

(54) TRAVELING-WAVE OPTICAL MODULATION DEVICE AND TRAVELING-WAVE OPTICAL MODULATOR

(71) Applicant: Wistron Corporation, New Taipei City (TW)

(72) Inventors: Cheng Hung Lu, New Taipei City (TW); Guan Fu Lu, New Taipei City (TW); Ching Pao Sun, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 413 days.

(21) Appl. No.: 18/443,312

(22) Filed: Feb. 16, 2024

(65) Prior Publication Data

US 2025/0231428 A1 Jul. 17, 2025

(30) Foreign Application Priority Data

Jan. 16, 2024 (TW) ................................ 113101722

(51) Int. Cl.
*G02F 1/01* (2006.01)

(52) U.S. Cl.
CPC ............ *G02F 1/0121* (2013.01); *G02F 1/011* (2013.01); *G02F 2203/50* (2013.01)

(58) Field of Classification Search
None
See application file for complete search history.

(56) References Cited

U.S. PATENT DOCUMENTS 5,675,673 A * 10/1997 Skeie ...................... G02F 1/225 385/40
10,488,683 B1 11/2019 Doerr
10,831,044 B1 * 11/2020 Doerr .................... G02F 1/2255

FOREIGN PATENT DOCUMENTS

CN 104516127 4/2015
CN 106575050 A * 4/2017 ........... G02F 1/2257
CN 121727531 A * 3/2026

* cited by examiner

*Primary Examiner* — Chris H Chu
(74) *Attorney, Agent, or Firm* — JCIPRNET

(57) ABSTRACT

A traveling-wave optical modulation device is configured to receive a first optical signal to be transmitted along a traveling direction. The traveling-wave optical modulation device includes first and second electrodes, a first optical waveguide, and matching inductors. The first optical waveguide is configured to allow the first optical signal to propagate in the first optical waveguide, and two sides are respectively electrically connected to the first and second electrodes. The matching inductors are arranged sequentially along the traveling direction, inductance values thereof increment along the traveling direction, and the inductance value of a first matching inductor arranged closest to a start of the traveling direction is less than that of a last matching inductor arranged closest to an end of the traveling direction. A first voltage is applied between the first and second electrodes to modulate a phase of the first optical signal. A traveling-wave optical modulator is also provided.

20 Claims, 9 Drawing Sheets

TRAVELING-WAVE OPTICAL MODULATION DEVICE AND TRAVELING-WAVE OPTICAL MODULATOR

CROSS-REFERENCE TO RELATED APPLICATION

This application claims the priority benefit of Taiwan application serial no. 113101722, filed on Jan. 16, 2024. The entirety of the above-mentioned patent application is hereby incorporated by reference herein and made a part of this specification.

BACKGROUND

Technical Field

The disclosure relates to an optical modulation device and an optical modulator, and in particular to a traveling-wave optical modulation device and a traveling-wave optical modulator.

Description of Related Art

The working principle of the Mach-Zehnder modulator (MZM) is to change the electric field distribution and the carrier concentration inside a waveguide through electrical signals applied to two phase modulation arms, thereby changing the refractive indices of the two phase modulation arms, so that there is a phase difference between optical waves passing through the two arms. If the two optical waves have the same phase at an output combiner, the superposition of the optical waves will form completely constructive interference. If the phases of the two optical waves at the output combiner differ by 180 degrees, the superposition of the optical waves will form completely destructive interference. If the completely constructive interference is formed, an output signal is 1. If the completely destructive interference is formed, the output signal is 0. In this way, a modulated optical signal may be obtained.

The MZM modulators may be divided into two types of lumped electrode and traveling wave electrode modulators, depending on the design of modulation electrodes thereof.

The bandwidth of the lumped electrode modulator is mainly limited by the parasitic capacitance of the electrodes. The size of the electrode is typically much less than the wavelength of the electrical signal, so the refractive index of the optical waveguide is modulated by the electrical signal of the electrodes. Although increasing the size of the electrodes can improve modulation efficiency, the parasitic capacitance also increases, which in turn limits the usable bandwidth. Therefore, the lumped electrode modulator requires a very high driving voltage to produce a large enough modulation effect in a modulation range of a small area.

In order to improve the shortcomings of the lumped electrode modulator, the traveling wave electrode modulator lengthens the length of the modulation electrode by designing the modulation electrode into a transmission line. The electrical signal is transmitted along the transmission line in the same transmission direction as the optical signal. Driver impedance and terminal impedance need to match the impedance of the transmission line electrode to prevent reflection. At this time, the optical signal travels along the optical waveguide while being modulated by the electrical signal. Modulation efficiency is highest when the electrical signal and the optical signal travel at the same speed.

Taking the optical waveguide formed by a P-N junction as an example, a modulation signal on the transmission electrode passes through a P-type semiconductor layer and an N-type semiconductor layer to change voltages at two ends of the P-N junction to control the refractive index of the optical waveguide. The equivalent series resistance of the P-type semiconductor layer/N-type semiconductor layer produces an R-C low pass effect with the capacitance of the P-N junction, resulting in a reduction in the operating bandwidth. Therefore, in order to reduce the series resistance, the spacing between two electrodes of a ground electrode and a signal electrode is normally reduced. In order to control the impedance of the transmission line electrode, the width of the signal electrode needs to be reduced. However, narrowing the electrode increases signal propagation loss on the electrode, reducing modulation efficiency thereof.

SUMMARY

The present disclosure provides a traveling-wave optical modulation device and a traveling-wave optical modulator that can increase an overall bandwidth of a system and has the advantage of impedance matching.

An embodiment of the disclosure provides a traveling-wave optical modulation device. The traveling-wave optical modulation device is configured to receive a first optical signal and transmit the first optical signal along a traveling direction. The traveling-wave optical modulation device includes a first electrode, a second electrode, a first optical waveguide, and multiple matching inductors. The first optical waveguide is configured to allow the first optical signal to propagate in the first optical waveguide, and two sides are respectively electrically connected to the first electrode and the second electrode. The matching inductors are arranged sequentially along the traveling direction, inductance values thereof increment along the traveling direction, and the inductance value of a first matching inductor arranged closest to a start of the traveling direction is less than the inductance value of a last matching inductor arranged closest to an end of the traveling direction. A first voltage is applied between the first electrode and the second electrode to modulate a phase of the first optical signal.

An embodiment of the disclosure provides a traveling-wave optical modulator, which includes a splitter, a traveling-wave optical modulation device, and an optical combiner. The splitter is configured to receive an optical signal and divide the optical signal into a first optical signal and a second optical signal. The traveling-wave optical modulation device is connected to the splitter and is configured to receive the first optical signal and the second optical signal, and transmit the first optical signal and the second optical signal along a traveling direction. The traveling-wave optical modulation device includes a first electrode, a second electrode, a first optical waveguide, a third electrode, a fourth electrode, a second optical waveguide, and multiple matching inductors. The first optical waveguide is configured to allow the first optical signal to propagate in the first optical waveguide, and two sides are respectively electrically connected to the first electrode and the second electrode. The second optical waveguide is configured to allow the second optical signal to propagate in the second optical waveguide, and two sides are respectively electrically connected to the third electrode and the fourth electrode. The matching inductors are arranged adjacent to the first optical waveguide or the second optical waveguide sequentially along the traveling direction and are respectively electrically connected between the first electrode and the first optical waveguide, between the second electrode and the first optical waveguide, between the third electrode and the second optical waveguide, or between the fourth electrode and the second optical waveguide. Inductance values of the matching inductors increment along the traveling direction, and the inductance value of a first matching inductor arranged closest to a start of the traveling direction is less than the inductance value of a last matching inductor arranged closest to an end of the traveling direction. The optical combiner is connected to the first optical waveguide and the second optical waveguide, and is configured to receive the first optical signal and the second optical signal. A first voltage is applied between the first electrode and the second electrode to modulate a phase of the first optical signal, and a second voltage is applied between the third electrode and the fourth electrode to modulate a phase of the second optical signal. The modulated first optical signal and second optical signal are received by the optical combiner to generate the modulated optical signal.

Based on the above, in the traveling-wave optical modulation device and the traveling-wave optical modulator adopting the traveling-wave optical modulation device according to the embodiments of the disclosure, the traveling-wave optical modulation device includes the first electrode, the second electrode, the first optical waveguide, and the matching inductors, and the matching inductors are designed to be arranged sequentially along the traveling direction, the inductance values thereof increment along the traveling direction, and the inductance value of the first matching inductor arranged closest to the start of the traveling direction is less than the inductance value of the last matching inductor arranged closest to the end of the traveling direction.

Therefore, the overall bandwidth of the system is increased and the system has impedance matching, thereby reducing issues such as signal reflection.

DESCRIPTION OF THE EMBODIMENTS

Figure 1:
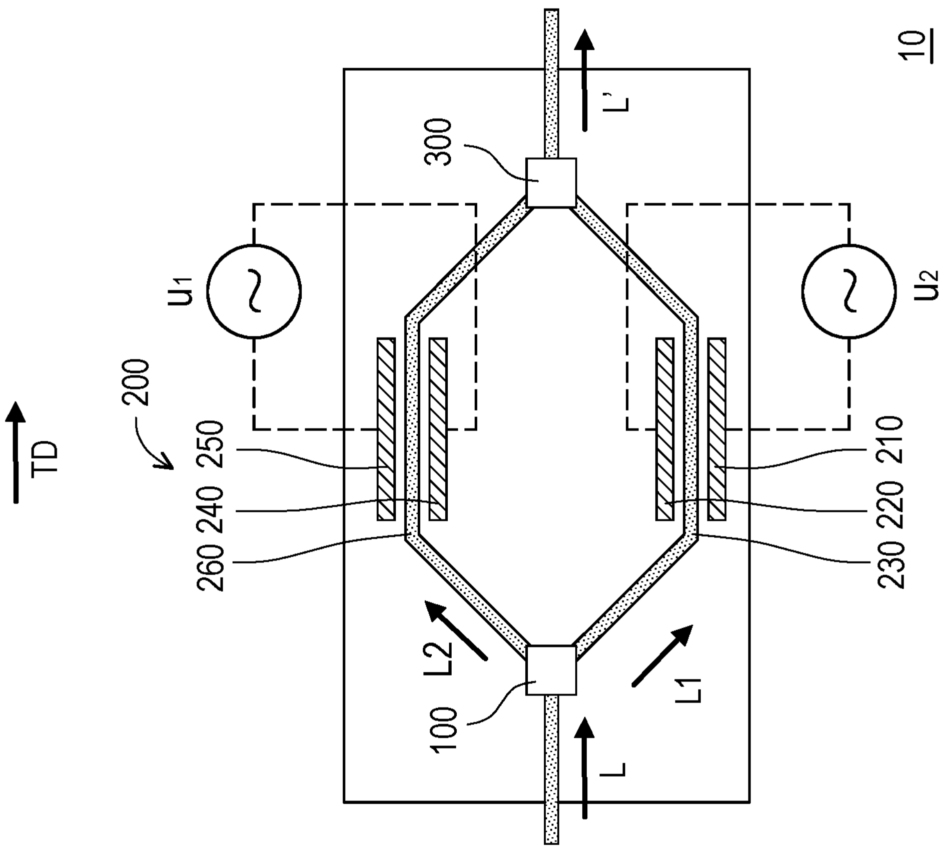
FIG. 1 is a schematic diagram of a traveling-wave optical modulator according to an embodiment of the disclosure.

FIG. 1 is a schematic diagram of a traveling-wave optical modulator according to an embodiment of the disclosure. Please refer to FIG. 1. An embodiment of the disclosure provides a traveling-wave optical modulator 10, which includes a splitter 100, a traveling-wave optical modulation device 200, and an optical combiner 300. The splitter 100 is configured to receive an optical signal L and divide the optical signal L into a first optical signal L1 and a second optical signal L2. The traveling-wave optical modulation device 200 is connected to the splitter 100 and is configured to receive the first optical signal L1 and the second optical signal L2, and transmit the first optical signal L1 and the second optical signal L2 along a traveling direction TD.

Figure 2A:
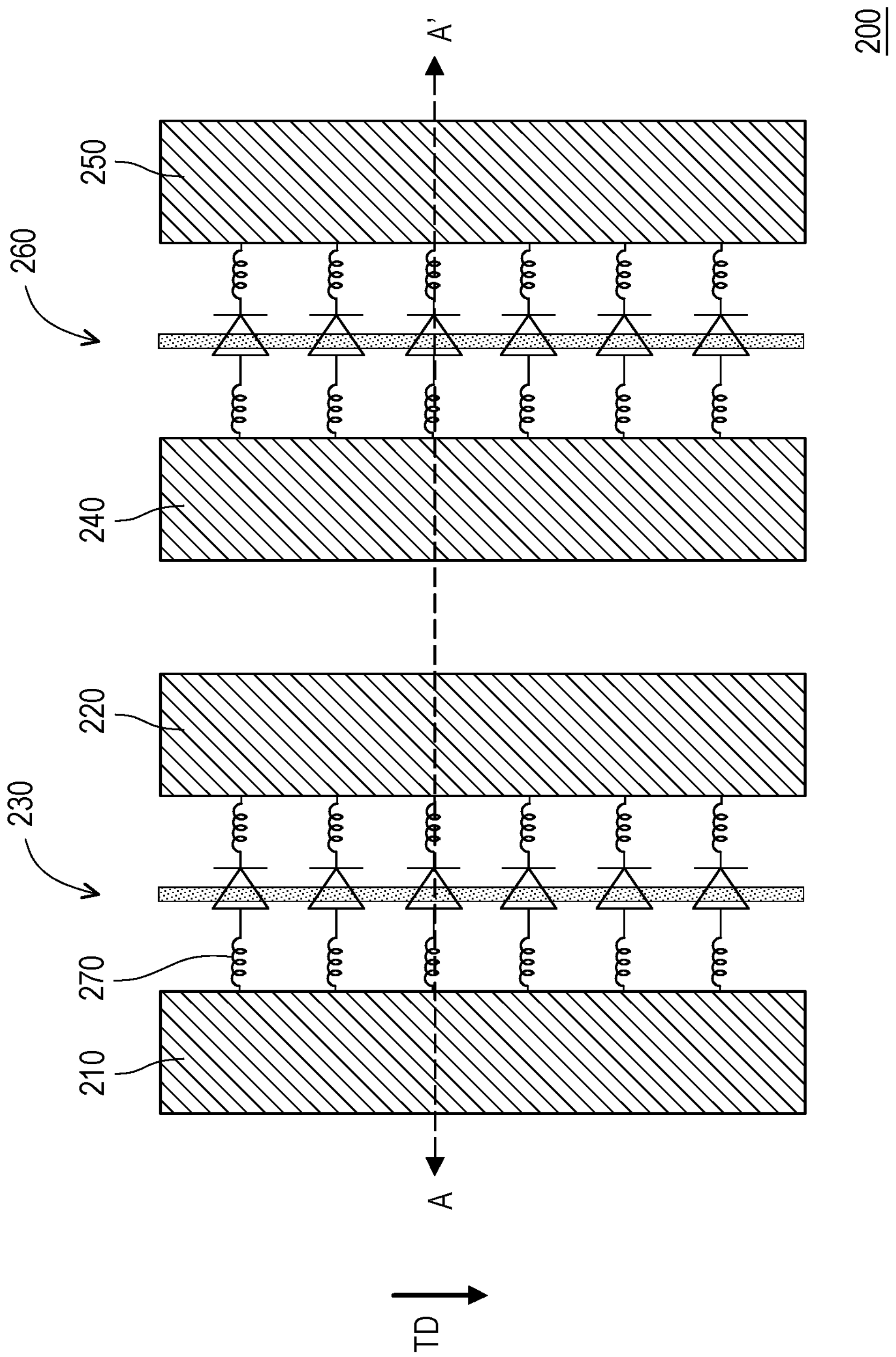
FIG. 2A is a simplified schematic diagram of a device model of a traveling-wave optical modulation device in FIG. 1.
Figure 2B:
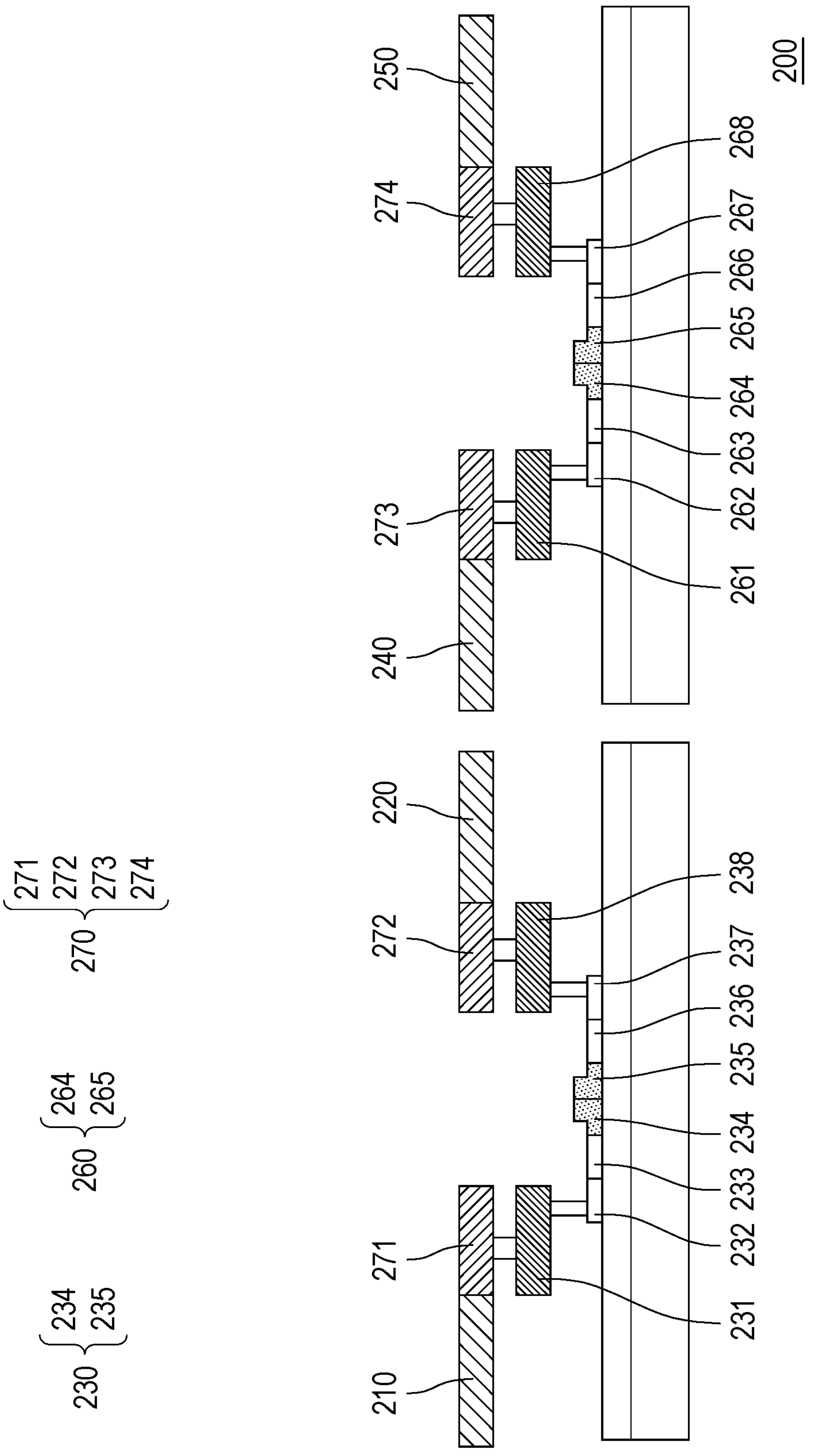
FIG. 2B is a cross-sectional schematic diagram of the traveling-wave optical modulation device in FIG. 1.

FIG. 2A is a simplified schematic diagram of a device model of a traveling-wave optical modulation device in FIG. 1. FIG. 2B is a cross-sectional schematic diagram of the traveling-wave optical modulation device in FIG. 1. FIG. 2B, for example, corresponds to a section line A-A' in FIG. 2A. Please refer to FIG. 1 to FIG. 2B. In the embodiment, the traveling-wave optical modulation device 200 includes a first electrode 210, a second electrode 220, a first optical waveguide 230, and multiple matching inductors 270. The first optical waveguide 230 is configured to allow the first optical signal L1 to propagate in the first optical waveguide 230, and two (opposite) sides respectively are electrically connected to the first electrode 210 and the second electrode 220. The matching inductors 270 are arranged sequentially along the traveling direction TD, inductance values thereof increment along the traveling direction TD, and the inductance value of the first matching inductor 270 arranged closest to a start of the traveling direction TD is less than the inductance value of the last matching inductor 270 arranged closest to an end of the traveling direction TD. The inductance values of the matching inductors 270 increment along the traveling direction TD may be defined as the inductance value of each matching inductor 270 being greater than or equal to the inductance value of the previous matching inductor 270 of each matching inductor 270 in the traveling direction TD or being less than or equal to the inductance value of the next matching inductor 270 of each matching inductor 270 in the traveling direction TD. A first voltage u1 is applied between the first electrode 210 and the second electrode 220 to modulate a phase of the first optical signal L1.

In the embodiment, the traveling-wave optical modulation device 200 is, for example, a P-N junction type light modulation device. For example, the first optical waveguide 230 includes a first type junction layer 234 and a second type junction layer 235. Further, the traveling-wave optical modulation device 200 further includes multiple connection layers connected to the first optical waveguide 230, including a metal layer 231, a first type high concentration semiconductor layer 232, a first type semiconductor layer 233, a second type semiconductor layer 236, a second type high concentration semiconductor layer 237, and a metal layer 238. The first type may be P type or N type, and the second type may be N type or P type. The first type high concentration semiconductor layer 232, the first type semiconductor layer 233, the first type junction layer 234, the second type junction layer 235, the second type semiconductor layer 236, and the second type high concentration semiconductor layer 237 are arranged in a direction perpendicular to the traveling direction TD and are coplanar. A P-N junction is formed between the first type junction layer 234 and the second type junction layer 235, and is configured to serve as an optical waveguide. The first type high concentration semiconductor layer 232 is electrically connected to the metal layer 231, and the metal layer 231 is electrically connected to the first electrode 210. The second type high concentration semiconductor layer 237 is electrically connected to the metal layer 238, and the metal layer 238 is electrically connected to the second electrode 220. Therefore, when the first voltage u1 is applied between the first electrode 210 and the second electrode 220, a refractive index of the optical waveguide formed by the P-N junction is changed to modulate the first optical signal L1.

In the embodiment, the traveling-wave optical modulation device 200 further includes a third electrode 240, a fourth electrode 250, and a second optical waveguide 260. The second optical waveguide 260 is configured to allow the second optical signal L2 to propagate in the second optical waveguide 260, and two (opposite) sides are respectively electrically connected to the third electrode 240 and the fourth electrode 250. A second voltage u2 is applied between the third electrode 240 and the fourth electrode 250 to modulate a phase of the second optical signal L2.

In the embodiment, similar to the first optical waveguide 230, the second optical waveguide 260 includes a first type junction layer 264 and a second type junction layer 265, and the traveling-wave optical modulation device 200 further includes multiple connection layers, a metal layer 261, a first type high concentration semiconductor layer 262, a first type semiconductor layer 263, a second type semiconductor layer 266, a second type high concentration semiconductor layer 267, and a metal layer 268, connected to the second optical waveguide 260. The first type high concentration semiconductor layer 262, the first type semiconductor layer 263, the first type junction layer 264, the second type junction layer 265, the second type semiconductor layer 266, and the second type high concentration semiconductor layer 267 are arranged in a direction perpendicular to the traveling direction TD and are coplanar. A P-N junction is formed between the first type junction layer 264 and the second type junction layer 265, and is configured to serve as an optical waveguide. The first type high concentration semiconductor layer 262 is electrically connected to the metal layer 261, and the metal layer 261 is electrically connected to the third electrode 240. The second type high concentration semiconductor layer 267 is electrically connected to the metal layer 268, and the metal layer 268 is electrically connected to the fourth electrode 250. Therefore, when the second voltage u2 is applied between the third electrode 240 and the fourth electrode 250, a refractive index of the optical waveguide formed by the P-N junction is changed to modulate the second optical signal L2.

In addition, in the embodiment, the matching inductor 270 is, for example, formed using a semiconductor process. The matching inductor 270 may be designed as a spiral inductor, a stacked inductor, or a solenoidal inductor, but the disclosure is not limited thereto. When the matching inductor 270 is designed as the stacked inductor, the matching inductor 270 may include multiple metal layers, and the metal layers are connected by vias.

Figure 3:
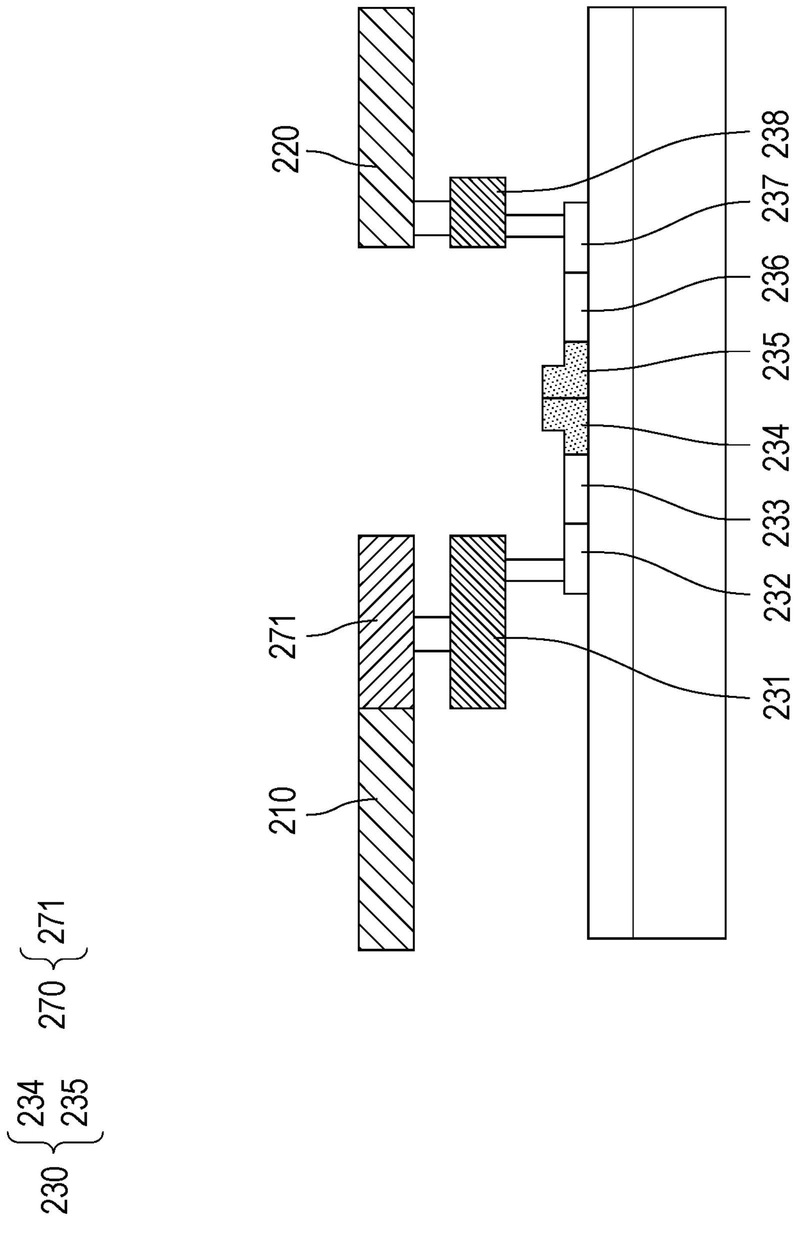
FIG. 3 is a cross-sectional schematic diagram of a traveling-wave optical modulation device at a first optical waveguide according to an exemplary embodiment of the disclosure.
Figure 4:
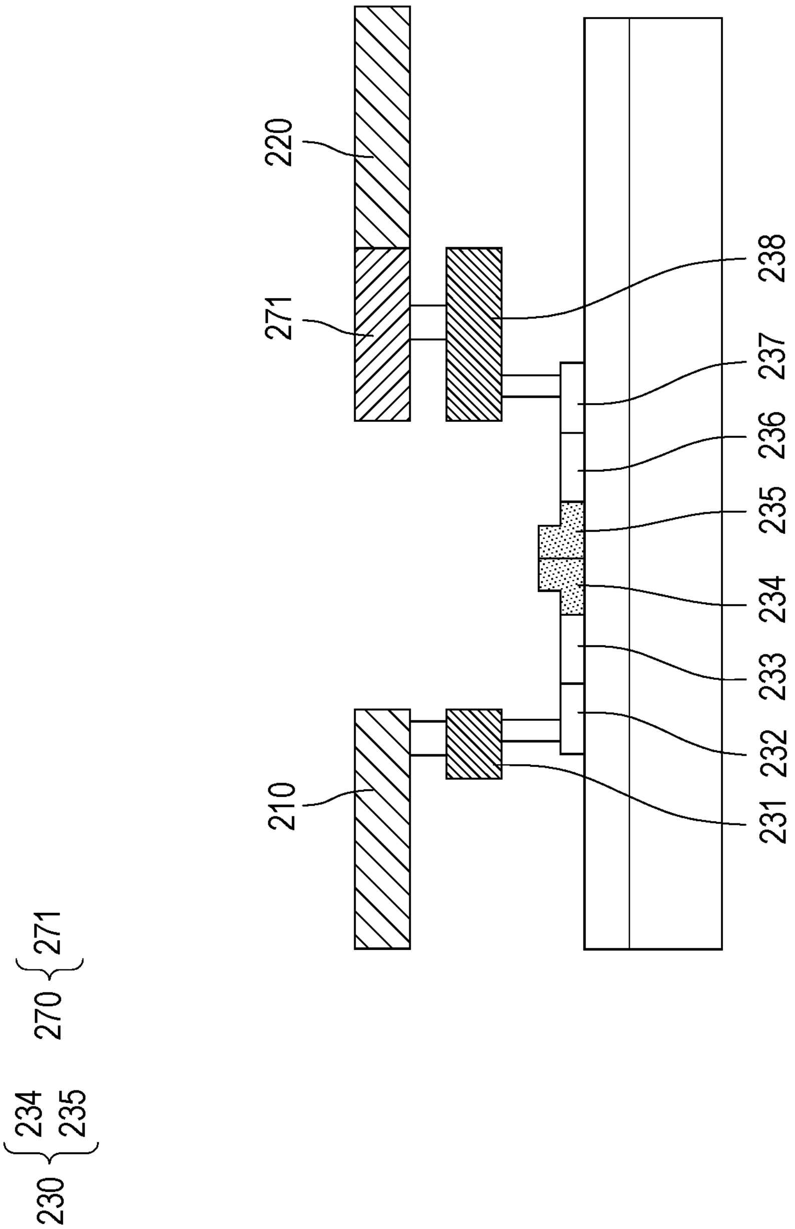
FIG. 4 is a cross-sectional schematic diagram of a traveling-wave optical modulation device at a first optical waveguide according to another exemplary embodiment of the disclosure.

FIG. 3 is a cross-sectional schematic diagram of a traveling-wave optical modulation device at a first optical waveguide according to an exemplary embodiment of the disclosure. FIG. 4 is a cross-sectional schematic diagram of a traveling-wave optical modulation device at a first optical waveguide according to another exemplary embodiment of the disclosure. Please refer to FIG. 3 and FIG. 4. In an embodiment, the matching inductors 270 are arranged adjacent to the first optical waveguide 230 sequentially along the traveling direction TD and are respectively electrically connected between the first electrode 210 and the first optical waveguide 230 or between the second electrode 220 and the first optical waveguide 230. For example, the matching inductors 270 are all electrically connected between the first electrode 210 and the first optical waveguide 230 as shown in FIG. 3, or the matching inductors 270 are all electrically connected between the second electrode 220 and the first optical waveguide 230 as shown in FIG. 4. In another embodiment, one of the matching inductors 270 may include a first sub-matching inductor 271 and a second sub-matching inductor 272. The first sub-matching inductor 271 is electrically connected between the first electrode 210 and the first optical waveguide 230, and the second sub-matching inductor 272 is electrically connected between the second electrode 220 and the first optical waveguide 230, but the disclosure is not limited thereto. In other embodiments, each matching inductor 270 may include the first sub-matching inductor 271 and the second sub-matching inductor 272, the first sub-matching inductor 271 is electrically connected between the first electrode 210 and the first optical waveguide 230, and the second sub-matching inductor 272 is electrically connected between the second electrode 220 and the first optical waveguide 230.

In yet another embodiment, the matching inductors 270 are sequentially arranged adjacent to the first optical waveguide 230 or the second optical waveguide 260 along the traveling direction TD and are respectively electrically connected between the first electrode 210 and the first optical waveguide 230, between the second electrode 220 and the first optical waveguide 230, between the third electrode 240 and the second optical waveguide 260, or between the fourth electrode 250 and the second optical waveguide 260, as shown in FIG. 2A and FIG. 2B. In other embodiments, one of the matching inductors 270 includes the first sub-matching inductor 271 and the second sub-matching inductor 272. The first sub-matching inductor 271 is electrically connected between the first electrode 210 and the first optical waveguide 230 or between the second electrode 220 and the first optical waveguide 230, and the second sub-matching inductor 272 is electrically connected between the third electrode 240 and the second optical waveguide 260 or between the fourth electrode 250 and the second optical waveguide 260, but the disclosure is not limited thereto. Each matching inductor 270 may include the first sub-matching inductor 271 and the second sub-matching inductor 272, the first sub-matching inductor 271 is electrically connected between the first electrode 210 and the first optical waveguide 230 or between the second electrode 220 and the first optical waveguide 230, and the second sub-matching inductor 272 is electrically connected between the third electrode 240 and the second optical waveguide 260 or between the fourth electrode 250 and the second optical waveguide 260.

In still another embodiment, one of the matching inductors 270 includes the first sub-matching inductor 271, the second sub-matching inductor 272, and a third sub-matching inductor 273. The first sub-matching inductor 271 is electrically connected between the first electrode 210 and the first optical waveguide 230, the second sub-matching inductor 272 is electrically connected between the second electrode 220 and the first optical waveguide 230, and the third sub-matching inductor 273 is electrically connected between the third electrode 240 and the second optical waveguide 260 or between the fourth electrode 250 and the second optical waveguide 260, but the disclosure is not limited thereto. In other embodiments, each matching inductor 270 may include the first sub-matching inductor 271, the second sub-matching inductor 272, and the third sub-matching inductor 273, the first sub-matching inductor 271 is electrically connected between the first electrode 210 and the first optical waveguide 230, the second sub-matching inductor 272 is electrically connected between the second electrode 220 and the first optical waveguide 230, and the third sub-matching inductor 273 is electrically connected between the third electrode 240 and the second optical waveguide 260 or between the fourth electrode 250 and the second optical waveguide 260.

In still another embodiment, as shown in FIG. 2A and FIG. 2B, one of the matching inductors 270 includes the first sub-matching inductor 271, the second sub-matching inductor 272, the third sub-matching inductor 273, and a fourth sub-matching inductor 274. The first sub-matching inductor 271 is electrically connected between the first electrode 210 and the first optical waveguide 230, the second sub-matching inductor 272 is electrically connected between the second electrode 220 and the first optical waveguide 230, the third sub-matching inductor 273 is electrically connected between the third electrode 240 and the second optical waveguide 260, and the fourth sub-matching inductor 274 is electrically connected between the fourth electrode 250 and the second optical waveguide 260, but the disclosure is not limited thereto. In other embodiments, each matching inductor 270 may include the first sub-matching inductor 271, the second sub-matching inductor 272, the third sub-matching inductor 273, and the fourth sub-matching inductor 274, the first sub-matching inductor 271 is electrically connected between the first electrode 210 and the first optical waveguide 230, the second sub-matching inductor 272 is electrically connected between the second electrode 220 and the first optical waveguide 230, the third sub-matching inductor 273 is electrically connected between the third electrode 240 and the second optical waveguide 260, and the fourth sub-matching inductor 274 is electrically connected between the fourth electrode 250 and the second optical waveguide 260.

Furthermore, in an embodiment, the inductance values of the matching inductors 270 increment along the traveling direction TD. For example, the inductance value of a first matching inductor, situated along the traveling direction TD, is less than or equal to that of the immediately following matching inductor. However, the inductance value of the first matching inductor, which is arranged closest to a start of the traveling direction TD, is strictly less than the inductance value of the last matching inductor, arranged closest to an end of the traveling direction TD. In other embodiments, the inductance values of the matching inductors 270 strictly increase along the traveling direction TD. For example, the inductance values of the matching inductors 270 strictly increase along the traveling direction TD by an arithmetic series, a geometric series, or an exponential law. The inductance values of the matching inductors 270 strictly increasing along the traveling direction TD may be defined as the inductance value of each matching inductor 270 being greater than the inductance value of the previous matching inductor 270 of each matching inductor 270 in the traveling direction TD.

Please refer to FIG. 1 again. In the embodiment, the optical combiner 300 is connected to the first optical waveguide 230 and the second optical waveguide 260, and is configured to receive the first optical signal L1 and the second optical signal L2. Furthermore, the modulated first optical signal L1 and second optical signal L2 are received by the optical combiner 300 to generate a modulated optical signal L'.

Figure 5:
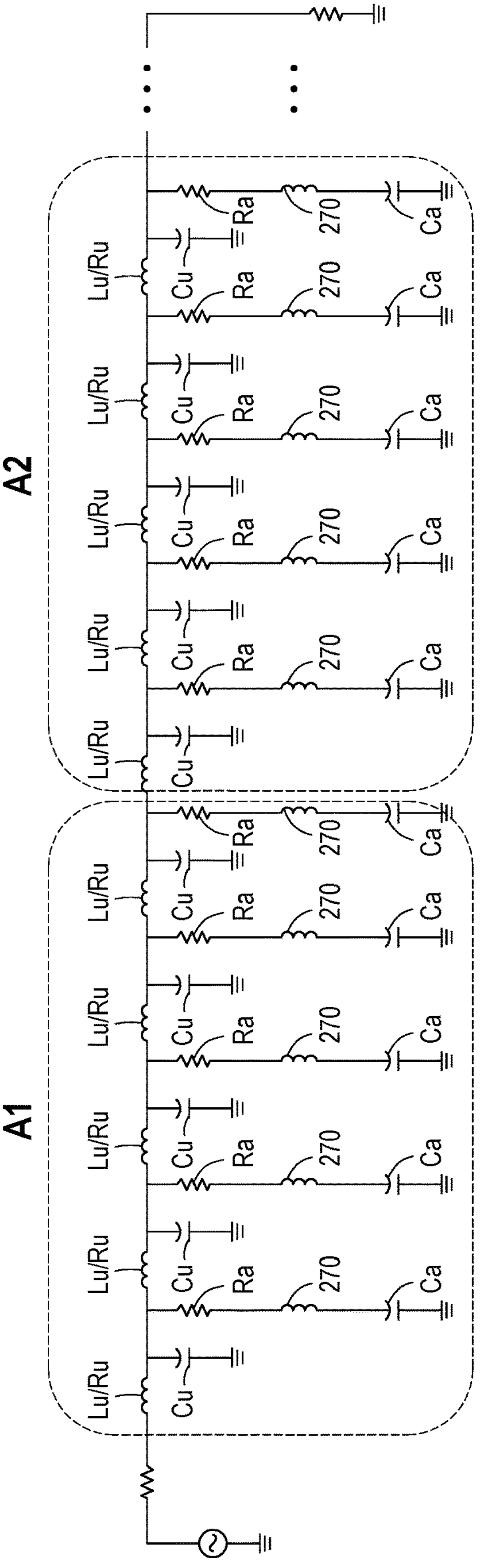
FIG. 5 is a simplified schematic diagram of an equivalent circuit model of a traveling-wave optical modulator according to an embodiment of the disclosure.
Figure 6:
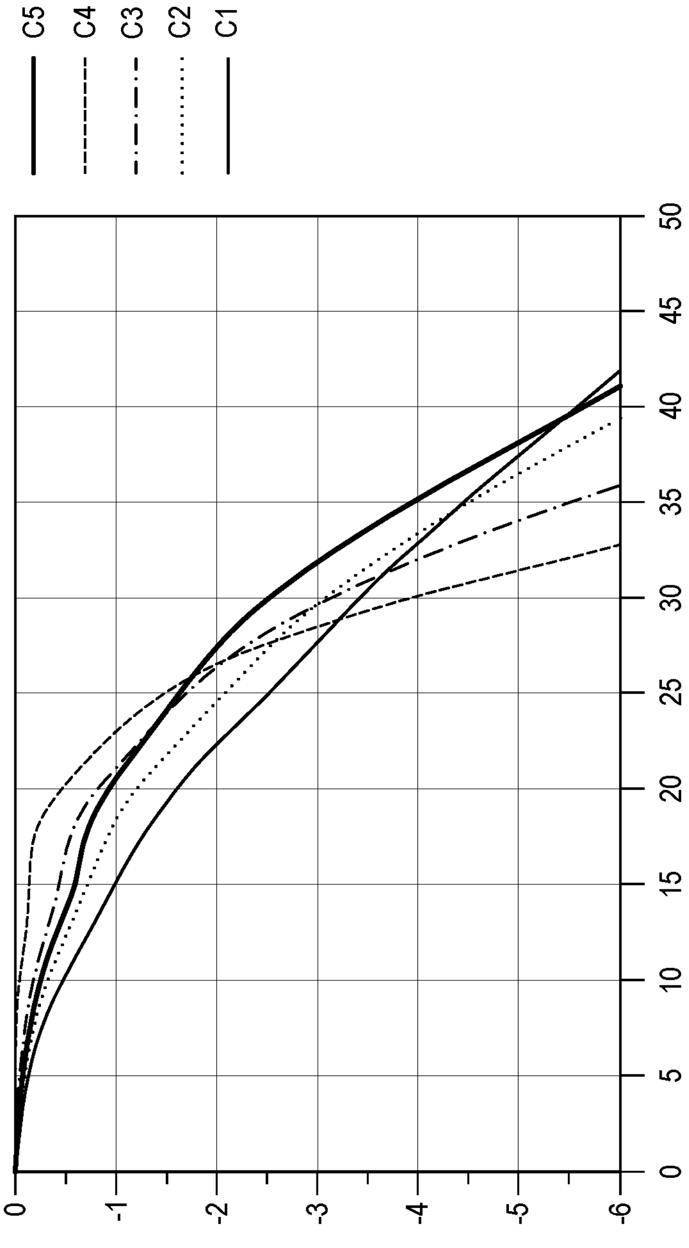
FIG. 6 is a curve diagram of different frequency responses obtained by using matching inductors with different inductance values of a traveling-wave optical modulator according to an embodiment of the disclosure.
Figure 7:
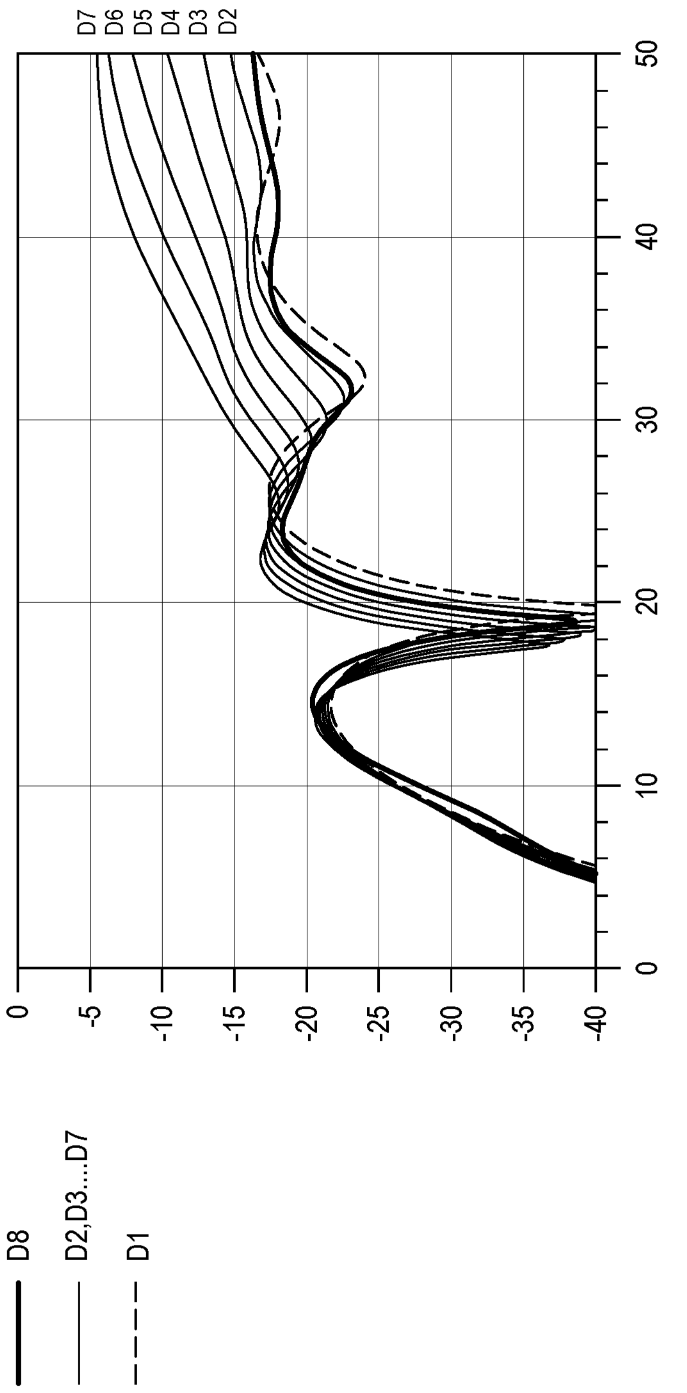
FIG. 7 is a curve diagram of different return losses obtained by using matching inductors with different inductance values of a traveling-wave optical modulator according to an embodiment of the disclosure.

FIG. 5 is a simplified schematic diagram of an equivalent circuit model of a traveling-wave optical modulator according to an embodiment of the disclosure. FIG. 6 is a curve diagram of different frequency responses obtained by using matching inductors with different inductance values of a traveling-wave optical modulator according to an embodiment of the disclosure. FIG. 7 is a curve diagram of different return losses obtained by using matching inductors with different inductance values of a traveling-wave optical modulator according to an embodiment of the disclosure.

In FIG. 5, the traveling-wave optical modulation device 200 in the traveling-wave optical modulator 10 is divided into 9 areas A1, A2, . . . along the traveling direction TD, and each area includes 5 units. The matching inductors 270 of the units in the same area have the same inductance value. The inductance values from the area A1 to the area A9 (not shown) are respectively La1, La2, . . . , La9. Each unit includes an inductor Lu, a resistor Ru, a capacitor Cu, a resistor Ra, a matching inductor 270, and a capacitor Ca. The inductor Lu, the resistor Ru, and the capacitor Cu are an equivalent inductor, an equivalent resistor, and an equivalent capacitor from the first electrode 210, the second electrode 220, the third electrode 240, and the fourth electrode 250. The resistor Ra and the capacitor Ca are a parasitic resistor and a parasitic capacitor from the first optical waveguide 230 and the second optical waveguide 260. By the way, based on cost considerations and better execution in design (for example, it is not easy to perfectly achieve a different inductance value for each matching inductor 270 in manufacturing), the traveling-wave optical modulation device 200 is divided into multiple areas A1, A2, . . . in FIG. 5, the inductance values of the matching inductors 270 in the same area may be the same, and the inductance values of the matching inductors 270 in each area are less than or equal to the inductance values of the matching inductors 270 in the next area along the traveling direction TD, so as to implement the condition of the inductance values gradually increasing. However, in other embodiments, the inductance values of the matching inductors 270 in the traveling-wave optical modulation device 200 may differ, or the inductance values of the matching inductors 270 within the same area may increment or strictly increase along the traveling direction TD.

TABLE 1

| Inductance value (nH) | 3 dB bandwidth (GHz) | Bandwidth increase ratio (%) |
|---|---|---|
| 0 | 27.6 | 0.00 |
| 0.2 | 28.9 | 4.71 |
| 0.4 | 29.6 | 7.25 |
| 0.6 | 29.9 | 8.33 |
| 0.8 | 29.6 | 7.25 |
| 1 | 29.2 | 5.80 |
| 1.2 | 28.5 | 3.26 |
| 0~1.3 | 31.9 | 15.58 |

TABLE 2

| Area | Value of matching inductor |
|---|---|
| Area 1 | La1 = 0 nH |
| Area 2 | La2 = 0 nH |
| Area 3 | La3 = 0.1 nH |

TABLE 2-continued

| Area | Value of matching inductor |
|---|---|
| Area 4 | La4 = 0.3 nH |
| Area 5 | La5 = 0.5 nH |
| Area 6 | La6 = 0.7 nH |
| Area 7 | La7 = 0.9 nH |
| Area 8 | La8 = 1.1 nH |
| Area 9 | La9 = 1.3 nH |

In FIG. 6, the horizontal axis is frequency (GHz) and the vertical axis is frequency response (dB). The equivalent circuit model of the traveling-wave optical modulator 10 adopts the following simulation parameters of Lu=0.062 nH, Ru=2.5 ohm, Cu=12.800 fF, Ra=160 ohm, and Ca=13.000 fF. The inductance values of the matching inductors 270 are set to 0 nH (the inductance value of Curve C1 or Table 1 is 0, that is, there is no matching inductor 270), 0.2 nH (the inductance value of Table 1 is 0.2), 0.4 nH (the inductance value of Curve C2 or Table 1 is 0.4), 0.6 nH (the inductance value of Table 1 is 0.6), 0.8 nH (the inductance value of Curve C3 or Table 1 is 0.8), 1 nH (the inductance value of Table 1 is 1), or 1.2 nH (the inductance value of Curve C4 or Table 1 is 1.2). Among the inductance values of 0 to 1.3 of Curve C5 or Table 1, the inductance values of the matching inductors 270 are set as shown in Table 2. The inductance values increment along with the 9 areas, starting from the area A1, the area A2, the area A3 (not shown in FIG. 5), . . . , the area A9 (not shown in FIG. 5). However, the disclosure does not limit the number of areas into which the traveling-wave optical modulation device 200 may be divided.

Please refer to FIG. 5, FIG. 6, and Table 1 first. When there is no matching inductor 270, the 3 dB bandwidth of the system is the smallest. On the contrary, when the matching inductor 270 is provided, the 3 dB bandwidth of the system increases. When the system is designed such that the inductance values of the matching inductors 270 increment along the traveling direction TD, that is, Curve C5, the system has the optimal 3 dB bandwidth.

In FIG. 7, the horizontal axis is frequency (GHz), and the vertical axis is input return loss in unit dB. Curve D1 shows the inductance values of the matching inductors 270 being all set to 0 nH, and Curves D2 to D7 show the inductance values of the matching inductors 270 being respectively set to fixed values such as 0.2 nH, 0.4 nH, 0.6 nH, 0.8 nH, 1.0 nH, and 1.2 nH. The inductance values of the matching inductors 270 in Curve D8 are set as shown in Table 2 and will not be repeated.

Please refer to FIG. 7. When the system is not provided with any matching inductor, that is, Curve D1, the return loss of the system is less than −15 dB, indicating impedance matching, thereby preventing signal reflection. However, when the system is provided with the matching inductor 270 and the inductance value is set to a fixed value, that is, Curves D2 to D7, the return loss of the system becomes greater. In other words, although the bandwidth of the system increases (for example, the inductance values of Curves C2 to $C_4$ of FIG. 6 or Table 1 are 0.2 to 1.2), impedance mismatch causes signal reflection, thereby degrading signal quality. When the system is designed such that the inductance values of the matching inductors 270 increment along the traveling direction TD, that is, Curve D8, the return losses of the system are all less than −15 dB in the entire frequency band, so the 3 dB bandwidth of the system is increased and the system has impedance matching, thereby preventing signal reflection.

Based on the above, in the traveling-wave optical modulation device 200 and the traveling-wave optical modulator 10 adopting the traveling-wave optical modulation device 200 according to the embodiments of the disclosure, the traveling-wave optical modulation device 200 is configured to receive the first optical signal L1 and transmit the first optical signal L1 along the traveling direction TD. The traveling-wave optical modulation device 200 includes the first electrode 210, the second electrode 220, the first optical waveguide 230, and the matching inductors 270. The matching inductors 270 are arranged sequentially along the traveling direction TD, the inductance values thereof increment along the traveling direction TD, and the inductance value of the first matching inductor 270 arranged closest to a start of the traveling direction TD is less than the inductance value of the last matching inductor 270 arranged closest to an end of the traveling direction TD. Therefore, the overall bandwidth of the system is increased and the system has impedance matching, thereby reducing issues such as signal reflection.

Figure 8:
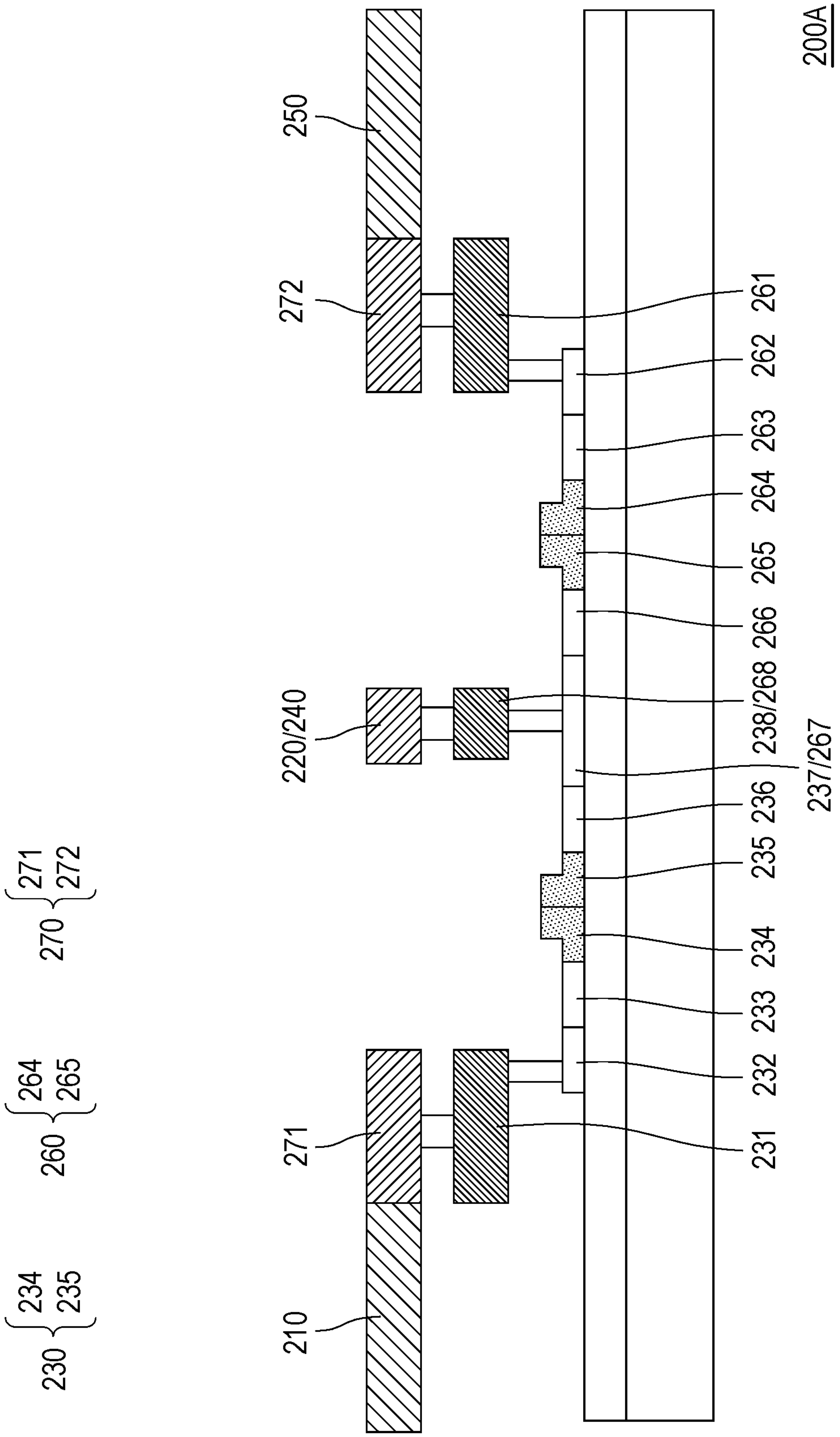
FIG. 8 is a schematic diagram of a traveling-wave optical modulation device according to another embodiment of the disclosure.

FIG. 8 is a schematic diagram of a traveling-wave optical modulation device according to another embodiment of the disclosure. Please refer to FIG. 8. A traveling-wave optical modulation device 200A is substantially the same as the traveling-wave optical modulation device 200 of FIG. 2B. The main difference is that in the embodiment, the second electrode 220 and the third electrode 240 form a common electrode. At the same time, the metal layer 238 connected to the first optical waveguide 230 and the metal layer 268 connected to the second optical waveguide 260 may be designed as a common metal layer, and the second type high concentration semiconductor layer 237 connected to the first optical waveguide 230 and the second type high concentration semiconductor layer 267 connected to the second optical waveguide 260 may also be designed as a common second type high concentration semiconductor layer.

Based on the above, in an embodiment of the disclosure, since the second electrode 220 and the third electrode 240 form the common electrode, a traveling-wave optical modulator adopting the traveling-wave optical modulation device 200A may form a push-pull type optical modulator, so the space utilization of the system is high. The other advantages of the traveling-wave optical modulation device 200A are the same as those of the traveling-wave optical modulation device 200 of FIG. 2B and will not be repeated.

In summary, in the traveling-wave optical modulation device and the traveling-wave optical modulator adopting the traveling-wave optical modulation device according to the embodiments of the disclosure, the traveling-wave optical modulation device includes the first electrode, the second electrode, the first optical waveguide, and the matching inductors. The matching inductors are designed to be arranged sequentially along the traveling direction, the inductance values thereof increment along the traveling direction, and the inductance value of the first matching inductor arranged closest to the start of the traveling direction is less than the inductance value of the last matching inductor arranged closest to the end of the traveling direction. Therefore, the overall bandwidth of the system is increased and the system has impedance matching, thereby reducing issues such as signal reflection.

What is claimed is:

1. A traveling-wave optical modulation device, configured to receive a first optical signal and transmit the first optical signal along a traveling direction, the traveling-wave optical modulation device comprising:

a first electrode;

a second electrode;

a first optical waveguide, configured to allow the first optical signal to propagate in the first optical waveguide, wherein two sides are respectively electrically connected to the first electrode and the second electrode; and a plurality of matching inductors, arranged sequentially along the traveling direction, wherein inductance values of the matching inductors increment along the traveling direction, and the inductance value of a first matching inductor arranged closest to a start of the traveling direction is less than the inductance value of a last matching inductor arranged closest to an end of the traveling direction, wherein a first voltage is applied between the first electrode and the second electrode to modulate a phase of the first optical signal.

2. The traveling-wave optical modulation device according to claim 1, wherein the matching inductors are arranged adjacent to the first optical waveguide sequentially along the traveling direction and are respectively electrically connected between the first electrode and the first optical waveguide or between the second electrode and the first optical waveguide.

3. The traveling-wave optical modulation device according to claim 2, wherein one of the matching inductors comprises a first sub-matching inductor and a second sub-matching inductor, wherein:

the first sub-matching inductor is electrically connected between the first electrode and the first optical waveguide, and the second sub-matching inductor is electrically connected between the second electrode and the first optical waveguide.

4. The traveling-wave optical modulation device according to claim 1, wherein the inductance values of the matching inductors strictly increase along the traveling direction.

5. The traveling-wave optical modulation device according to claim 1, wherein the traveling-wave optical modulation device has a plurality of areas, and the matching inductors in the same area have the same inductance value.

6. The traveling-wave optical modulation device according to claim 1, further comprising:

a third electrode;

a fourth electrode; and a second optical waveguide, wherein the traveling-wave optical modulation device is configured to receive a second optical signal and in the first optical waveguide the second optical signal along the traveling direction, the second optical waveguide is configured to allow the second optical signal to propagate in the second optical waveguide, and two sides are respectively electrically connected to the third electrode and the fourth electrode, wherein a second voltage is applied between the third electrode and the fourth electrode to modulate a phase of the second optical signal.

7. The traveling-wave optical modulation device according to claim 6, wherein the matching inductors are arranged adjacent to the first optical waveguide or the second optical waveguide sequentially along the traveling direction and are respectively electrically connected between the first electrode and the first optical waveguide, between the second electrode and the first optical waveguide, between the third electrode and the second optical waveguide, or between the fourth electrode and the second optical waveguide.

8. The traveling-wave optical modulation device according to claim 7, wherein one of the matching inductors comprises a first sub-matching inductor and a second sub-matching inductor, wherein:

the first sub-matching inductor is electrically connected between the first electrode and the first optical waveguide or between the second electrode and the first optical waveguide, and the second sub-matching inductor is electrically connected between the third electrode and the second optical waveguide or between the fourth electrode and the second optical waveguide.

9. The traveling-wave optical modulation device according to claim 7, wherein one of the matching inductors comprises a first sub-matching inductor, a second sub-matching inductor, and a third sub-matching inductor, wherein:

the first sub-matching inductor is electrically connected between the first electrode and the first optical waveguide, the second sub-matching inductor is electrically connected between the second electrode and the first optical waveguide, and the third sub-matching inductor is electrically connected between the third electrode and the second optical waveguide or between the fourth electrode and the second optical waveguide.

10. The traveling-wave optical modulation device according to claim 7, wherein one of the matching inductors comprises a first sub-matching inductor, a second sub-matching inductor, a third sub-matching inductor, and a fourth sub-matching inductor, wherein:

the first sub-matching inductor is electrically connected between the first electrode and the first optical waveguide, the second sub-matching inductor is electrically connected between the second electrode and the first optical waveguide, the third sub-matching inductor is electrically connected between the third electrode and the second optical waveguide, and the fourth sub-matching inductor is electrically connected between the fourth electrode and the second optical waveguide.

11. The traveling-wave optical modulation device according to claim 6, wherein the second electrode and the third electrode form a common electrode.

12. A traveling-wave optical modulator, comprising:

a splitter, configured to receive an optical signal and divide the optical signal into a first optical signal and a second optical signal;

a traveling-wave optical modulation device, connected to the splitter and configured to receive the first optical signal and the second optical signal, and allow the first optical signal and the second optical signal to propagate along a traveling direction, comprising:

a first electrode;

a second electrode;

a first optical waveguide, configured to allow the first optical signal to propagate in the first optical waveguide, wherein two sides are respectively electrically connected to the first electrode and the second electrode;

a third electrode;

a fourth electrode;

a second optical waveguide, configured to allow the second optical signal to propagate in the second optical waveguide, wherein two sides are respectively electrically connected to the third electrode and the fourth electrode; and a plurality of matching inductors, arranged adjacent to the first optical waveguide or the second optical waveguide sequentially along the traveling direction and respectively electrically connected between the first electrode and the first optical waveguide, between the second electrode and the first optical waveguide, between the third electrode and the second optical waveguide, or between the fourth electrode and the second optical waveguide, wherein inductance values of the matching inductor incrementing along the traveling direction, and the inductance value of a first matching inductor arranged closest to a start of the traveling direction is less than the inductance value of a last matching inductor arranged closest to an end of the traveling direction; and an optical combiner, connected to the first optical waveguide and the second optical waveguide, and configured to receive the first optical signal and the second optical signal, wherein a first voltage is applied between the first electrode and the second electrode to modulate a phase of the first optical signal, and a second voltage is applied between the third electrode and the fourth electrode to modulate a phase of the second optical signal, wherein the modulated first optical signal and second optical signal are received by the optical combiner to generate the modulated optical signal.

13. The traveling-wave optical modulator according to claim 12, wherein the matching inductors are sequentially arranged adjacent to the first optical waveguide along the traveling direction and are respectively electrically connected between the first electrode and the first optical waveguide or between the second electrode and the first optical waveguide.

14. The traveling-wave optical modulator according to claim 13, wherein one of the matching inductors comprises a first sub-matching inductor and a second sub-matching inductor, wherein:

the first sub-matching inductor is electrically connected between the first electrode and the first optical waveguide, and the second sub-matching inductor is electrically connected between the second electrode and the first optical waveguide.

15. The traveling-wave optical modulator according to claim 12, wherein the inductance values of the matching inductors strictly increase along the traveling direction.

16. The traveling-wave optical modulator according to claim 12, wherein the traveling-wave optical modulation device has a plurality of areas, and the matching inductors in the same area have the same inductance value.

17. The traveling-wave optical modulator according to claim 12, wherein one of the matching inductors comprises a first sub-matching inductor and a second sub-matching inductor, wherein:

the first sub-matching inductor is electrically connected between the first electrode and the first optical waveguide or between the second electrode and the first optical waveguide, and the second sub-matching inductor is electrically connected between the third electrode and the second optical waveguide or between the fourth electrode and the second optical waveguide.

18. The traveling-wave optical modulator according to claim 12, wherein one of the matching inductors comprises a first sub-matching inductor, a second sub-matching inductor, and a third sub-matching inductor, wherein:

the first sub-matching inductor is electrically connected between the first electrode and the first optical waveguide, the second sub-matching inductor is electrically connected between the second electrode and the first optical waveguide, and the third sub-matching inductor is electrically connected between the third electrode and the second optical waveguide or between the fourth electrode and the second optical waveguide.

19. The traveling-wave optical modulator according to claim 12, wherein one of the matching inductors comprises a first sub-matching inductor, a second sub-matching inductor, a third sub-matching inductor, and a fourth sub-matching inductor, wherein:

the first sub-matching inductor is electrically connected between the first electrode and the first optical waveguide, the second sub-matching inductor is electrically connected between the second electrode and the first optical waveguide, the third sub-matching inductor is electrically connected between the third electrode and the second optical waveguide, and the fourth sub-matching inductor is electrically connected between the fourth electrode and the second optical waveguide.

20. The traveling-wave optical modulator according to claim 12, wherein the second electrode and the third electrode form a common electrode.

* * * * *